Oct. 23, 1962  E. MARTINOLI ET AL  3,059,541
ROCKETS CARRIED IN CLUSTERS BY A LAUNCHING
MACHINE AND IN PARTICULAR AN AIRCRAFT
Filed March 25, 1958  4 Sheets-Sheet 3
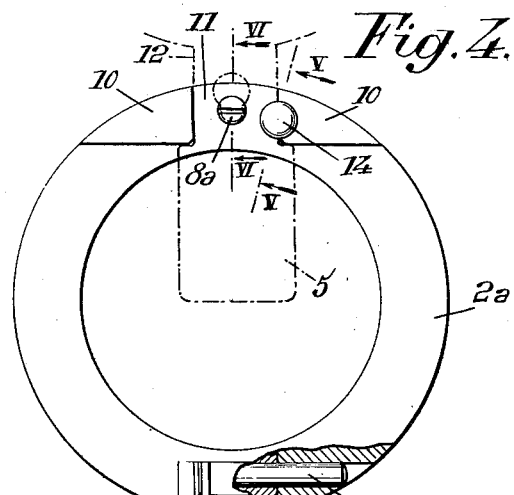
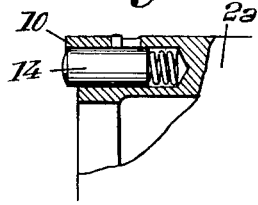
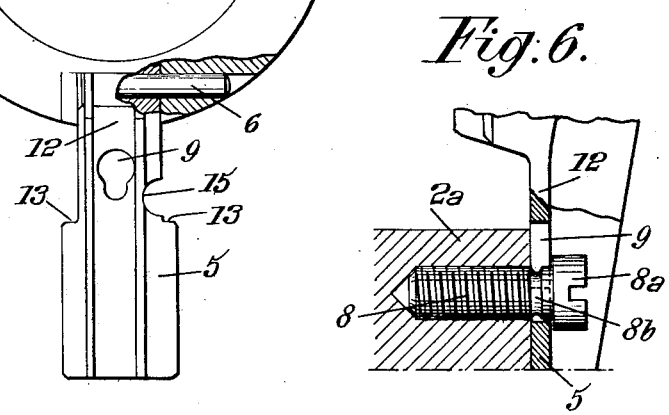
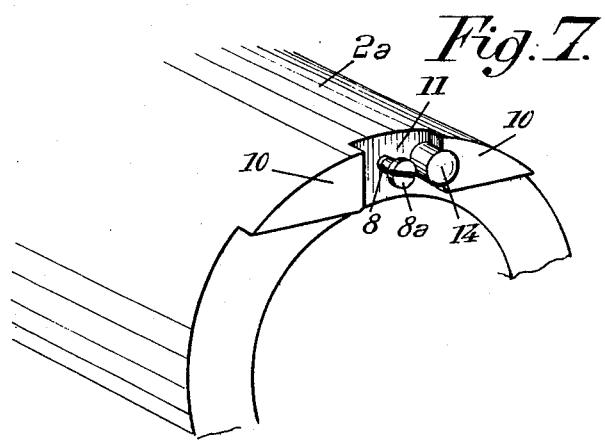
INVENTORS
EDOARDO MARTINOLI
CLAUDE MEIER
BY Larson and Taylor
ATTORNEY

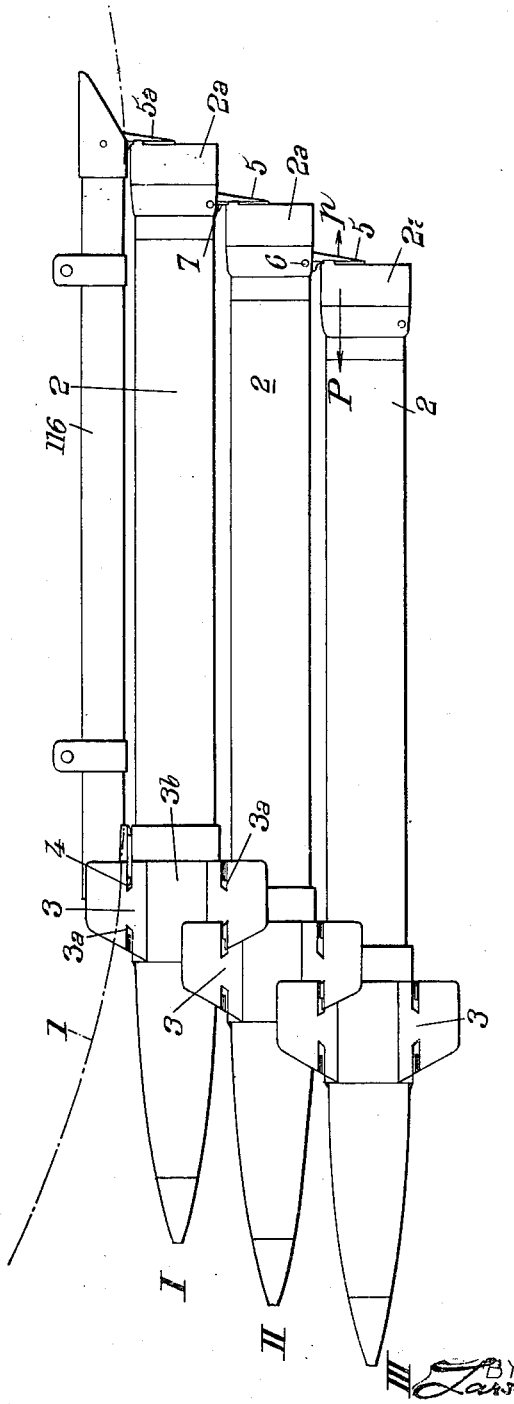

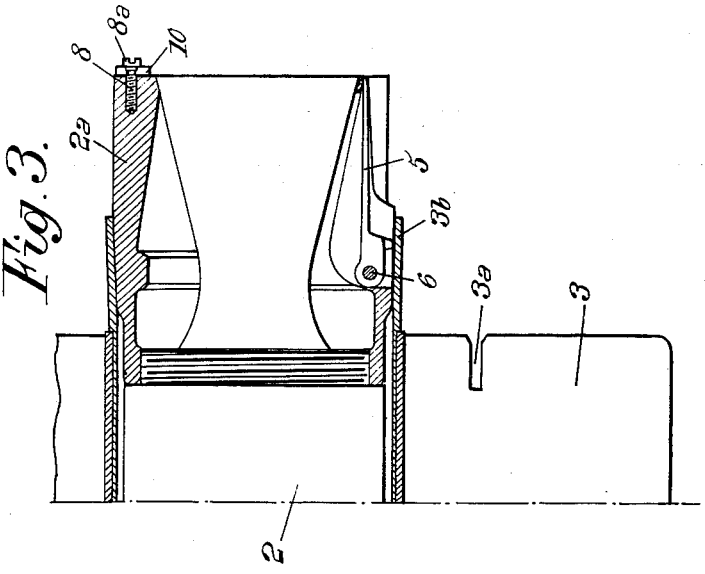
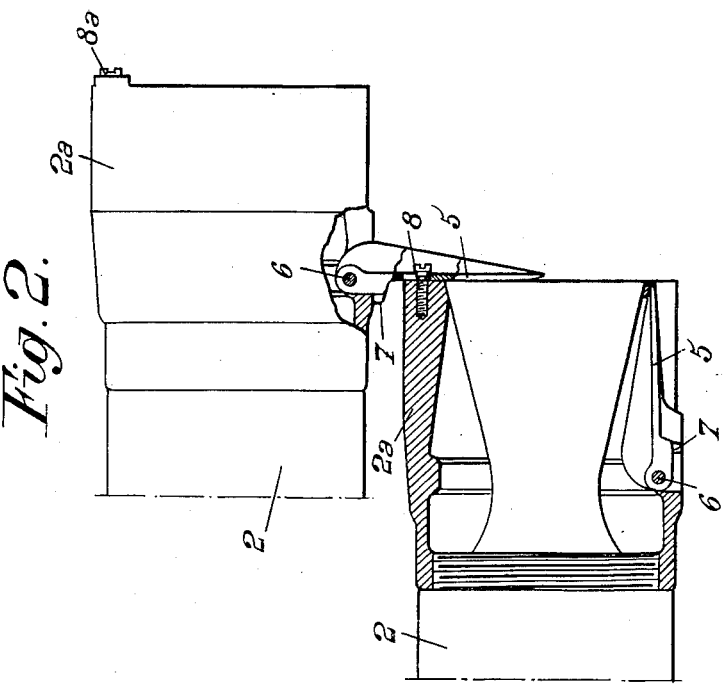

INVENTORS
EDOARDO MARTINOLI
CLAUDE MEIER

ATTORNEY

United States Patent Office 3,059,541
Patented Oct. 23, 1962

3,059,541
ROCKETS CARRIED IN CLUSTERS BY A LAUNCHING MACHINE AND IN PARTICULAR AN AIRCRAFT
Edoardo Martinoli, Grand-Saconnex, and Claude Meier, Geneva, Switzerland, assignors to Brevets Aero-Mecaniques S.A., Geneva, Switzerland, a society of Switzerland
Filed Mar. 25, 1958, Ser. No. 723,689
Claims priority, application Luxembourg Mar. 27, 1957
8 Claims. (Cl. 89—1.7)

The present invention relates to rockets carried in clusters by a launching machine and in particular an aircraft. A cluster of rockets, in the meaning we give to this term, is constituted by two or more rockets each of which is supported either by another rocket or by an element of said launching machine and is supporting another rocket, these rockets being to be fired successively, the last supported one being the first to be fired.

The object of our invention is to provide a combination of rockets of this kind which is better adapted to meet the requirements of practice than those known up to this time.

The combination with which our invention is concerned includes at least two rockets, a supporting one and a supported one, parallel to each other and carried by a support (which may be either an element of the launching machine, for instance an aircraft wing, or another rocket itself supported by such an element), the supporting rocket being connected with said support through holding means calculated to resist any frontward thrust applied to said supporting rocket which does not exceed a given value but to break under the effect of a higher thrust.

According to our invention, the supported rocket is connected with the supporting one through an assembly device including a member interposed between said two rockets to oppose frontward movement of the supported one with respect to the supporting one, said member being calculated to break under the action of a force exceeding said value, a part carried by the supporting rocket and projecting therefrom into the space in line with and at the rear of the rearwardly directed nozzle of the supported rocket being so mounted on said supporting rocket and having a surface transverse to the fore-and-aft direction of said rockets such that, when said supported rocket is fired, its gas stream jet imparts to said part a rearward thrust which is transmitted to the supporting rocket whereby, when the supported rocket is fired and before said member is broken, the frontward thrust transmitted to the supporting rocket is lower than said given value for which the supporting rocket holding means are adapted to break.

Preferred embodiments of our invention will be hereinafter described with reference to the accompanying drawings, given merely by way of example and in which:

FIG. 1 is a diagrammatic elevational view showing a cluster of rockets arranged according to the invention and mounted under the wing of an aircraft.

FIG. 2 shows, on an enlarged scale, with more details and with parts in section, the rear portions of two rockets disposed one above the other.

FIG. 3 is an axial sectional view of the rear portion of one of said rockets after it has been launched.

FIG. 4 is a rear view, on a still larger scale, of the same rocket before it was launched.

FIGS. 5 and 6 are sectional views, on a still larger scale, on the lines V—V and VI—VI of FIG. 4.

FIG. 7 is a part view showing in perspective the rear end of one of said rockets.

Figure 10:
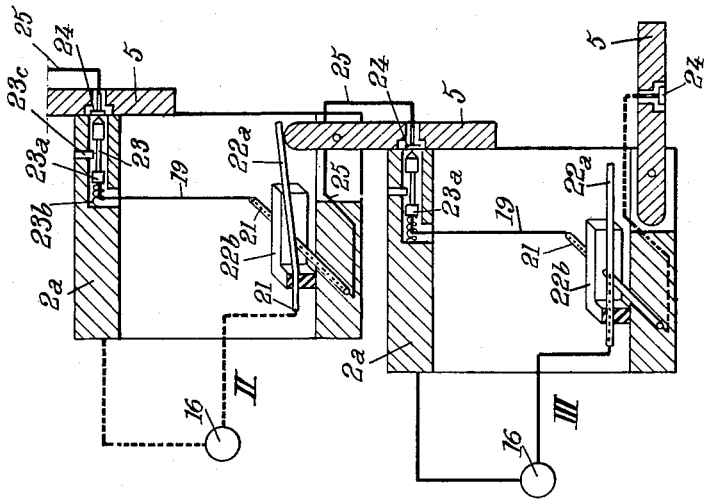
FIG. 10 shows the mechanical arrangement of an ignition system as illustrated by Fig. 8.

The rockets to be used according to the present invention may be of any suitable type and in particular they include a body 2 provided, at the rear, with a nozzle 2a through which escape the combustion gases of the propelling charge of the rocket.

A cluster of such rockets is shown mounted under the wing 1 of an aircraft (FIG. 1).

The devices for assembling each rocket with those located above and below it may be, as known, divided into a front portion and a rear portion, the front portion being advantageously constituted, for every rocket, by a sliding tail unit 3 which is temporarily mounted, before the launching, in a forward position and acts as a guide for the rocket body during the beginning of launching, said sliding tail unit being carried along by the rear portion of the rocket when it comes to engage said tail unit so that it then occupies the position which it is to have on the rocket body and where it remains during the flight of the rocket.

In order to enable the tail unit 3 to act as holding and axial guiding means, it suffices to provide, in the tail fins of said unit, longitudinal slots 3a by means of which the upper tail fins of the tail unit of a rocket may be supported by the lower tail fins of the tail unit of the rocket located above it. The tail unit of the last rocket to be fired, that is to say of the uppermost rocket, is supported by engaging the slots 3a of its upper tail fins in supporting rods 4 rigid with the wing 1 of the aircraft. With such an arrangement, each rocket is slightly offset toward the front with respect to the rocket located above it.

We will consider two rockets such as an upper rocket II and a lower rocket III (FIG. 1), both extending horizontally, at different levels, below a support which, in this case, is constituted by a rocket I.

The upper rocket II is connected with said support, i.e. with rocket I, through holding means (interposed between the rear portions of said rockets II and I) calculated to resist without breaking any frontward thrust applied to said upper rocket which does not exceed a given value, but to break under the effect of a higher thrust.

According to our invention, the lower rocket III hangs from the upper rocket II through an assembly device which includes on the one hand a member (visible at 8 on FIG. 2) interposed between said two rockets II and III to oppose frontward movement of the lower rocket III with respect to the upper rocket II, said member 8 being calculated to break under the action of a force exceeding the above mentioned value and exerted by the lower rocket III when said rocket is fired, and on the other hand a part 5 carried by the upper rocket II and projecting downwardly therefrom into the space in line with and at the rear of the rearwardly directed nozzle 2a of said lower rocket III, said part 5 being so mounted on said upper rocket II and having a surface transverse to the fore-and-aft direction of said rockets such that, when said lower rocket III is fired, its gas stream jet, issuing from nozzle 2a, imparts to said part 5 a rearward thrust which is transmitted to said upper rocket II, whereby, when the lower rocket III is fired and before said member 8 is broken, the frontward thrust transmitted to the upper rocket II is lower than the above mentioned given value for which the upper rocket holding means interposed between said rocket II and rocket I are adapted to break.

Preferably, the part 5 of every rocket is retractable, and for instance it is constituted by a plate or flap pivoted to said rocket about a horizontal axis 6 located near the front end of said plate so that, when a rocket is launched, the plate 5 of the rocket located immediately above it is driven rearwardly and upwardly by the propelling gas jet issuing from the rocket that is being launched. Said plate 5 is then caused to engage a corresponding recess provided in the wall of the nozzle 2a of its rocket. Of course, every plate 5 must be prevented from pivoting frontwardly beyond its active position, that is to say its position where it is substantially at right angles to the fore-and-aft direction of the rockets. For this purpose, plate 5 is provided with a projection 7 adapted to come into contact with the wall of nozzle 2a, as clearly visible for instance on FIG. 2.

The above mentioned member 8 which is to be interposed between the two rockets so as to prevent, for a time, any frontward movement of the lower rocket with respect to the upper rocket, may be constituted by a screw extending parallel to the axis of the rockets in the rear portion of the nozzle 2a of the lower rocket, said screw including a head 8a which can be engaged through a slot 9 provided in the plate 5 of the upper rocket.

In order to determine in an accurate manner the value of the force which causes screw 8 to break under the effect of the tensile force applied thereto, said screw is advantageously provided, between its stem and its head, with a groove 8b of accurately determined dimensions and where the screw will break.

In the embodiment illustrated by the drawings, the pivot axis 6 of the plate 5 of the upper rocket is so positioned that said plate 5, when it extends vertically in the downward direction, is applied against the rear edge of the lower rocket in correct position of assembly with respect to the upper rocket.

This rear edge is annular since it surrounds the outlet of the rocket nozzle. At the upper portion of this annular edge, we provide two rearward projections 10, so as to form between them a radial groove 11 in which the arm 12 of plate 5 can fit without transverse play. Plate 5, being of greater width than said arm 12, forms horizontal projections 13 which are adapted to come into contact with the under faces of projections 10 when the two rockets are assembled correctly with respect to each other. Owing to this arrangement, the lower rocket cannot move down with respect to the upper rocket which supports it.

Screw 8 is located in the middle of the bottom of groove 11. The distance between said groove bottom and the head 8a of screw 8 is slightly greater than the thickness of arm 12.

Slot 9 is provided at the top with an enlarged extension through which the head 8a of screw 8 can pass, when the lower rocket which carries said screw is brought, at a level slightly above that which corresponds to the correct assembly position, opposite plate 5, in vertical position, carried by the upper rocket. When the lower rocket is allowed to move down into its correct position of assembly, the stem of screw 8 is engaged in the narrow portion of slot 9 and the two rockets are then prevented from moving axially with respect to each other. A spring locking member 14, parallel to screw 8 and partly housed in one of the projections 10, is adapted to engage a notch 15 provided in the vertical side walls of arm 12 when the two rockets are correctly assembled together. These two rockets are thus securely kept in correct position with respect to each other.

When the lower rocket is fired, the head 8a of screw 8 is broken under the combined action of the propelling thrust P of the lower rocket and of the thrust p exerted by the gas stream from said lower rocket upon the plate 5. One of these forces, P, pulls screw 8 in the frontward direction, whereas the other one, p, pushes the head 8a of said screw toward the rear. But it is very important to note that, until screw 8 is thus broken, the pull in the frontward direction, transmitted by plate 5 to the upper rocket, is equal to the difference $P-p$ between these forces.

When the lower rocket is released by the breaking of this head, plate 5 is violently driven rearwardly and upwardly so as to house itself into the corresponding recess provided in the wall of nozzle 2a.

The lower rocket slips in its tail unit 3 until the rear end of the rocket body, which is of greater diameter, engages said tail unit and carries it along. At the same time, as shown on FIG. 3, the rear portion of the sleeve 3b which constitutes the body of the tail unit passes over plate 5 retracted in the wall of nozzle 2a so as to keep it in said retracted position. Of course, the asymmetrical shape resulting from the presence of plate 5 is compensated for, from the aerodynamic and dynamic points of view, by giving a suitable shape to nozzle 2a.

As above stated, the uppermost rocket, that is to say the rocket I of FIG. 1, is hanging from a support 116 fixed to the aircraft wing and provided, both at the front and at the rear, with the same assembly elements as above described with respect to the rockets.

The flap or plate 5a of this support 116 may be made stronger than those of the rockets.

The chief advantages of the combination above described are as follows:

It is possible to dispense with a special launching device, which is a great advantage from the point of view of weight and drag.

The fixation of the rockets with respect to one another is quite rigid.

Screws 8 may be arranged so as to release the rockets in conditions which are practically always the same, owing to the possibility of very accurately machining groove 8b, which determines the resistance to breaking of screw 8.

Finally, it is possible to hang from one another a number of rockets which depends only upon the mechanical resistance of the suspension elements.

Advantageously, rockets as above described are fired by means of individual igniting means carried by each of them.

Of course it is advisable, for the sake of safety, to make the igniting devices of the respective rockets of a cluster inoperative with the exception of the lowermost rocket, which is the first to be launched.

According to a particular feature of our invention, advantage is taken of the fact that, when a rocket ceases to support another one located under it, the plate 5 of the first mentioned rocket is swung upwardly and rearwardly to control, by means of the swing movement, a switching operation which shifts the electrical means of the rocket from a position where they are inoperative to pass an electrical current through the primer thereof to a position where said means are set to produce the operation of the primer when an electric current is fed thereto.

Figure 9:
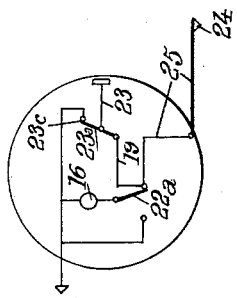
FIG. 9 shows the lay-out of the electric ignition system of one rocket before it has been incorporated in said cluster.
Figure 8:
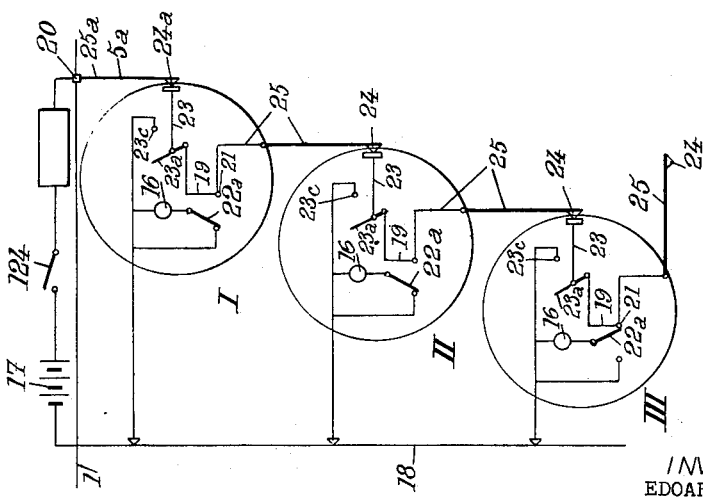
FIG. 8 shows the lay-out of the electric ignition system of a cluster of rockets (including three rockets).

FIGS. 8 to 10 disclose an embodiment of such an arrangement, FIG. 8 diagrammatically showing the electric lay-out in a cluster constituted by three rockets I, II and III which are to be fired in the order III, II, I and FIG. 10 showing the corresponding mechanical arrangement for rockets II and III.

According to this arrangement, every rocket is provided with a primer 16 for setting off the propelling charge of the rocket, said primer being operated by an electric current supplied by a source 17 located on board the aircraft. One terminal of said primer 16 is permanently connected with the metallic structure of the rocket. When several rockets such as I, II, III (FIG. 8) are assembled together to form a cluster, their metallic structures are in electric contact with one another, forming the equivalent of a conductor 18 connected with one terminal of electric source 17. Thus one terminal of every primer 16 is permanently connected with one terminal of source 17.

The other terminal of the primer 16 of every rocket is connected with a movable switch element 22a mounted in the rocket. This switch element 22a is mechanically controlled by the plate 5 of the rocket, for instance as shown by FIG. 10. In this embodiment of the invention, said switch element 22a is constituted by a resilient strip of a conductor material, for instance a metal, held at one end in a mass 22b of insulating material. The other end of said switch element 22a is arranged to cooperate with one end of plate 5 so that when said plate 5 is swung down in vertical position (case of rockets I and II) said metal strip 22a is bent upwardly, to be out of contact with a conductor pin 21. In this position, switch element 22a connects, through plate 5, the second terminal of primer 16 with the metal structure 18. On the contrary, when plate 5 is swung up in horizontal position (case of rocket III) metal strip 22a is applied against pin 21, and the second mentioned terminal of primer 16 is connected, through a circuit including said pin 21 and insulated from the metal structure conventionally represented by conductor 18. Said circuit starts from a terminal 20 carried by the aircraft and connected (with the interposition of manually operated switch 124) with the other terminal of electric source 17. It includes a conductor 25a carried by the plate 5a adapted to hold the rear end of rocket I, a conductor member 25 mounted in rocket I and in contact with the end 24a of conductor 25a, a conductor 19, also in said rocket, inserted between said member 23 and the pin 21 of said rocket and a conductor 25 starting from said pin 21 and extending in said rocket and along the plate 5 thereof. The end 24 of this conductor 25 is in contact with one end of a circuit section 23—19—21—25—24 provided in rocket II, and electrically insulated from the metallic structure of said rocket. The end 24 of said last mentioned circuit section is in contact with the circiut section 23—19—21 of rocket III. But as this rocket III is the last one of the cluster and therefore its plate 5 is in horizontal position, its switch element 22a is not bent upwardly by said plate 5 and is therefore in contact with pin 21. The circuit is therefore connected through this last mentioned switch element 22a with the terminal of primer 16 which is not permanently connected with conductor 18 and the left hand terminal of source 17.

Therefore, in the arrangement shown by FIG. 8, the primers 16 of rockets I and II have both of their terminals connected with the metallic structure 18. But the primer 16 of rocket III has one of its terminals connected with the left hand terminal of battery 17 and its other terminal connected with the terminal 20 on the aircraft. It suffices to close switch 24 to operate this last mentioned primer and therefore to fire rocket III. As a consequence of this operation the plate 5 of rocket II is swung up into horizontal position and the primer 16 of said rocket II is in turn made ready to operate when switch 124 is closed.

Advantageously, as shown by the drawing, conductor member 23 is movable in the rocket body and arranged so that when the rocket is not hanging from that located above it, said conductor member 23 is in contact with the metallic structure of the rocket. For instance, as shown by FIG. 10 conductor member 23 is slidable in the rocket body and is urged toward the right by a spring 23b. When member 23 is allowed to move toward the right, a projection 23a thereof comes into contact with an abutment 23c of the rocket body. Member 23 is thus in contact with the metal structure of the rocket. This is the case when a rocket is separate, as shown by FIG. 9. Both of the terminals of primer 16 are then connected with the metallic mass of the rocket and an electric current can therefore not pass through said primer despite the fact that switch element 22a is then in contact with pin 21 and connected with conductor 25.

On the contrary, when the rocket is hanging from another rocket (or from support 1), the contact 24 (or 24a) pushes conductor member 23 toward the left, moving contacts 23a and 23c away from each other, so that member 23 is insulated from the metallic body of the rocket.

With such an igniting arrangement, all the electric connections are incorporated in the rockets and there is no external cable for connecting them with a source of electricity. All the electric connections are automatically produced without possibility of any mistake.

In a general manner, while we have, in the above description, disclosed what we deem to be practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. For use in connection with a support, the combination of at least two rockets, an upper one and a lower one, disposed at different respective levels below said support, said rockets being parallel to each other, said rockets having rear nozzles, holding means attaching the upper rocket to said support, said means having a shearable portion of such a strength as to resist any frontward thrust applied to said upper rocket which does not exceed a given value and to break under the effect of a higher thrust, an assembly device for hanging said lower rocket from said upper rocket, said assembly device including a member attaching said two rockets to oppose frontward movement of said lower rocket with respect to said upper rocket, said member having a shearable portion of such a strength as to break under the action of a force exceeding said value to detach said supported rocket for forward movement, and a plate pivoted to the lower portion of said upper rocket so as to project downwardly therefrom into the space in line with and at the rear of the rear nozzle of the lower rocket, said plate being pivoted to said upper rocket about an axis located in the plane of said plate and transverse to the fore-and-aft direction of said rockets, said lower portion of said upper rocket being provided with a recess located rearwardly of said axis and adapted to accommodate said plate, whereby said plate can be retracted, by rearward and upward rotation about said axis, into said recess, said plate being attached to said member so as to be kept in position transverse to said fore-and-aft direction as long as said member is not broken, whereby, when said lower rocket is fired and until said member is broken, said plate receives from the gas stream issuing from the rearward nozzle of said lower rocket and transmits to the upper rocket a substantial rearward thrust acting in opposition to the frontward thrust transmitted through said member from the lower rocket to the upper one, and when said member is broken, said plate is driven by said gas stream into retracted position in said recess.

2. A combination according to claim 1 in which the rear edge of said lower rocket and portions of the sides of said plate are intermeshed to prevent relative movement of said rockets with respect to each other in directions transverse to their fore-and-aft directions while said member remains unbroken.

3. For use in connection with a support, the combination of at least two rockets, an upper one and a lower one, disposed at different respective levels below said support, said rockets being parallel to each other, said rockets having rear nozzles, holding means for connecting the upper rocket with said support, said means having a shearable portion of such a strength as to resist any frontward thrust applied to said upper rocket which does not exceed a given value and to break under the effect of a higher thrust, an assembly device for hanging said lower rocket from said upper rocket, said assembly device including a plate pivoted to the lower portion of said upper rocket so as to project downwardly therefrom into the space in line with and at the rear of the rear nozzle of the lower rocket, said plate being pivoted to said upper rocket about an axis located in the plane of said plate and transverse to the fore-and-aft direction of said rockets, said lower portion of said upper rocket being provided with a recess located rearwardly of said axis and adapted to accommodate said plate, whereby said plate can be retracted, by rearward and upward rotation about said axis, into said recess, cooperating abutment means carried by said plate and said upper rocket for preventing said plate from pivoting frontwardly beyond the position where it is substantially at right angles to said fore-and-aft direction, a member fixed at its front end to the rear face of said lower rocket and bearing at its other end against an intermediate point of the rear face of said plate in said last mentioned position thereof so as to oppose frontward movement of said lower rocket with respect to said upper rocket, said member having a shearable portion of such a strength as to break under the effect of a tensile force exceeding said given value, whereby, when said lower rocket is fired and until said member is broken, said plate receives from the gas stream issuing from the rearward nozzle of said lower rocket and transmits to the upper rocket a substantial rearward thrust acting in opposition to the frontward thrust transmitted through said member from the lower rocket to the upper one, and when said member is broken, said plate is driven by said gas stream into retracted position in said recess.

4. A combination according to claim 3 in which said member is a screw parallel to said fore-and-aft direction, said screw having a stem the front end of which is screwed in the rear end of said lower rocket and, at the rear end of said stem, a head of a diameter larger than that of said stem, and said plate being provided with a slot of a width intermediate between the diameter of said stem and that of said head, through which said stem extends, so that said head is bearing against the rear face of said plate over a portion of the edge of said slot.

5. A combination according to claim 3 in which said member is a screw parallel to said fore-and-aft direction, said screw having a stem the front end of which is screwed in the rear end of said lower rocket and, at the rear end of said stem, a head of a diameter larger than that of said stem, and said plate being provided with a slot of a width intermediate between the diameter of said stem and that of said head, through which said stem extends, so that said head is bearing against the rear face of said plate over a portion of the edge of said slot, said slot having an upper extension of a width greater than the diameter of said head.

6. For use in connection with a support, the combination of at least two rockets, an upper one and a lower one, disposed at different respective levels below said support, said rockets being parallel to each other, said rockets having rear nozzles, holding means for connecting the upper rocket with said support, said means being adapted to resist any frontward thrust applied to said upper rocket which does not exceed a given value and to break under the effect of a higher thrust, an assembly device for hanging said lower rocket from said upper rocket, said assembly device including a plate pivoted to the lower portion of said upper rocket so as to project downwardly therefrom into the space in line with and at the rear of the rear nozzle of the lower rocket, said plate being pivoted to said upper rocket about an axis located in the plane of said plate and transverse to the fore-and-aft direction of said rockets, said lower portion of said upper rocket being provided with a recess located rearwardly of said axis and adapted to accommodate said plate, whereby said plate can be retracted, by rearward and upward rotation about said axis, into said recess, cooperating abutment means carried by said plate and said upper rocket for preventing said plate from pivoting frontwardly beyond the position where it is substantially at right angles to said fore-and-aft direction, a member fixed at its front end to the lower rocket and bearing at its other end against an intermediate point of the rear face of said plate in said last mentioned position thereof so as to oppose frontward movement of said lower rocket with respect to said upper rocket, said member being adapted to break under the effect of a tensile force exceeding said given value, whereby, when said lower rocket is fired and until said member is broken, said plate receives from the gas stream issuing from the rearward nozzle of said lower rocket and transmits to the upper rocket a substantial rearward thrust acting in opposition to the frontward thrust transmitted through said member from the lower rocket to the upper one, and when said member is broken, said plate is driven by said gas stream into retracted position in said recess, said member being a screw parallel to said fore-and-aft direction, said screw having a stem the front end of which is screwed in the rear end of said lower rocket and, at the rear end of said stem, a head of a diameter larger than that of said stem, and said plate being provided with a slot of a width intermediate between the diameter of said stem and that of said head, through which said stem extends, so that said head is bearing against the rear face of said plate over a portion of the edge of said slot, said slot having an upper extension of a width greater than the diameter of said head, the rear annular edge of the rear nozzle of the lower rocket being located in the same transverse plane as the front face of said plate, said edge including two rearward projections limiting between them a vertical groove the vertical walls of which are on either side respectively of said screw head, said plate including a narrow portion adapted to fit in said groove, the larger portion of said plate, located below said narrow portion, having its upper edge applied against the under faces of said projections when said screw stem is engaged in the bottom portion of said slot, a cylindrical locking piece parallel to said fore-and-aft direction resiliently mounted in the rear portion of said rear edge of the lower rocket rear nozzle, at least partly between said groove vertical walls, said plate being provided with a notch adapted to cooperate with said locking piece so as to accommodate it when said piece comes opposite said notch and is resiliently urged toward the rear.

7. For use in connection with a support, the combination of at least two rockets, an upper one and a lower one, disposed at different respective levels below said support, said rockets being parallel to each other, said rockets having rear nozzles, holding means for attaching the upper rocket to said support, said means having a shearable portion of such a strength as to resist any frontward thrust applied to said upper rocket which does not exceed a given value and to break under the effect of a higher thrust, an assembly device for hanging said lower rocket from said upper rocket, said assembly device including a member attaching said two rockets to oppose frontward movement of said lower rocket with respect to said upper rocket, said member having a shearable portion of such strength as to break under the action of a force exceeding said given value, and a plate pivoted to and carried exclusively by said upper rocket and projecting downwardly therefrom into the space in line with and at the rear of the rear nozzle of the lower rocket, said plate having a surface area transverse to the fore-and-aft direction of said rockets and disposed behind the nozzle of the lower rocket so that, when said lower rocket is fired, the plate receives a substantial rearward thrust from the gas stream issuing from the rearward nozzle of said lower rocket and transmits the rearward thrust to the upper rocket, the said plate being retractable and the body of the said upper rocket having a recess for retraction of the plate therein, the plate being attached to and held by said member to prevent retraction of the plate into said rocket body as long as said member is not broken.

8. For use in connection with a support, the combination of at least two rockets, an upper one and a lower one, disposed at different respective levels below said support, said rockets being parallel to each other, said rockets having near nozzles, holding means for attaching the upper rocket to said support, said means having a shearable portion of such a strength as to resist any frontward thrust applied to said upper rocket which does not exceed a given value and to break under the effect of a higher thrust, an assembly device for hanging said lower rocket from said upper rocket, said assembly device including a member attaching said two rockets to oppose frontward movement of said lower rocket with respect to said upper rocket, said member having a shearable portion of such strength as to break under the action of a force exceeding said given value, and a plate pivoted to and carried exclusively by said upper rocket and projecting downwardly therefrom into the space in line with and at the rear of the rear nozzle of the lower rocket, the said member attaching the rear end of the lower rocket to said plate and the said plate having a surface area transverse to the fore-and-aft direction of said rockets and disposed behind the nozzle of the lower rocket so that, when said lower rocket is fired, the plate receives a substantial rearward thrust from the gas stream issuing from the rearward nozzle of said lower rocket and transmits the rearward thrust to the upper rocket.

References Cited in the file of this patent

UNITED STATES PATENTS

| | | |
|---|---|---|
| 1,841,983 | Rhulemann | Jan. 19, 1932 |
| 2,591,834 | Kuka | Apr. 8, 1952 |
| 2,788,712 | Kuller et al. | Apr. 16, 1957 |
| 2,792,756 | Schneiter | May 21, 1957 |
| 2,832,265 | Reid et al. | Apr. 29, 1958 |